United States Patent
Tseng

(10) Patent No.: US 9,924,533 B2
(45) Date of Patent: Mar. 20, 2018

(54) METHOD AND APPARATUS FOR REDUCING SIGNALING AND DELAY FOR UPLINK SCHEDULING IN A WIRELESS COMMUNICATION NETWORK

(71) Applicant: INNOVATIVE SONIC CORPORATION, Taipei (TW)

(72) Inventor: Li-Chih Tseng, Taipei (TW)

(73) Assignee: INNOVATIVE SONIC CORPORATION, Taipei (TW)

(*) Notice: Subject to any disclaimer, the term of this patent is extended or adjusted under 35 U.S.C. 154(b) by 1045 days.

(21) Appl. No.: 13/863,712

(22) Filed: Apr. 16, 2013

(65) Prior Publication Data

US 2013/0272235 A1 Oct. 17, 2013

Related U.S. Application Data

(60) Provisional application No. 61/624,615, filed on Apr. 16, 2012.

(51) Int. Cl.
- *H04W 52/40* (2009.01)
- *H04W 72/12* (2009.01)
- *H04W 56/00* (2009.01)

(52) U.S. Cl.
CPC ... *H04W 72/1289* (2013.01); *H04W 56/0005* (2013.01)

(58) Field of Classification Search
CPC ......... H04W 56/0005; H04W 72/1289; H04W 72/00

(Continued)

(56) References Cited

U.S. PATENT DOCUMENTS

2009/0232107 A1* 9/2009 Park ................ H04B 7/2681
370/336
2010/0195640 A1* 8/2010 Park ................ H04W 56/0005
370/350

(Continued)

FOREIGN PATENT DOCUMENTS

| CN | 102047747 A | 5/2011 |
| CN | 102118801 A | 7/2011 |
| WO | 2009088204 A2 | 7/2009 |

OTHER PUBLICATIONS

Ericsson, Initial TA value, SGPP TSG-RAN WG2 #77bis, Tdoc R2-121552, Jeju, South Korea, Mar. 26-30, 2012, pp. 1-3.*

(Continued)

*Primary Examiner* — Zhiren Qin
(74) *Attorney, Agent, or Firm* — Blue Capital Law Firm, P.C.

(57) ABSTRACT

A method and apparatus are disclosed for reducing signaling and delay for uplink scheduling in a wireless communication network. The method includes activating a newly configured SCell (Secondary Cell). The method also includes starting a TA (Timing Alignment/Advance) timer associated with the SCell upon detection of a specific DL (Downlink) signaling. The method further includes detecting and processing a PDCCH (Physical Downlink Control Channel) for a PUSCH (Physical Uplink Shared Channel) transmission. In addition, the method includes sending a MAC (Mac Access Control) PDU (Protocol Data Unit) corresponding to the PDCCH scheduling on a PUSCH of the SCell based on an UL transmission timing equal to a specific value.

20 Claims, 8 Drawing Sheets

(58) Field of Classification Search
USPC .......................................................... 370/329
See application file for complete search history.

(56) References Cited

U.S. PATENT DOCUMENTS

| 2011/0249641 | A1* | 10/2011 | Kwon | ............... | H04W 74/0833 |
| | | | | | 370/329 |
| 2014/0112308 | A1* | 4/2014 | Kwon | ............... | H04W 56/0005 |
| | | | | | 370/331 |
| 2014/0233535 | A1* | 8/2014 | Zhao | ................. | H04W 72/0453 |
| | | | | | 370/336 |

OTHER PUBLICATIONS

3GPP, 3GPP TS 36.521-3 v8.0.1, Jun. 2009, pp. 1-368.*
3GPP TSG RAN WG2 #77bis, Jeju, South Korea, Mar. 26-30, 2012 (Tdoc R2-121552).
Office Action on corresponding TW Patent Application No. 102113399 dated Mar. 25, 2015.

* cited by examiner

METHOD AND APPARATUS FOR REDUCING SIGNALING AND DELAY FOR UPLINK SCHEDULING IN A WIRELESS COMMUNICATION NETWORK

CROSS-REFERENCE TO RELATED APPLICATIONS

The present application claims the benefit of U.S. Provisional Patent Application Ser. No. 61/624,615 filed on Apr. 16, 2012, the entire disclosure of which is incorporated herein by reference.

FIELD

This disclosure generally relates to wireless communication networks, and more particularly, to a method and apparatus for reducing signaling and delay for uplink scheduling in a wireless communication network.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method and apparatus are disclosed for reducing signaling and delay for uplink scheduling in a wireless communication network. The method includes activating a newly configured SCell (Secondary Cell). The method also includes starting a TA (Timing Alignment/Advance) timer associated with the SCell upon detection of a specific DL (Downlink) signaling. The method further includes detecting and processing a PDCCH (Physical Downlink Control Channel) for a PUSCH (Physical Uplink Shared Channel) transmission. In addition, the method includes sending a MAC (Mac Access Control) PDU (Protocol Data Unit) corresponding to the PDCCH scheduling on a PUSCH of the SCell based on an UL transmission timing equal to a specific value.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including Document Nos. TS 36.300 V10.5.0 (2011 September) "Overall description; Stage 2"; TS 36.321 V10.3.0 (2011 September) "Medium Access Control (MAC) protocol specification"; TS 36.213 V10.3.0 (2011-09) "Physical layer procedures"; R2-121552 "Initial TA value", Ericsson, S T Ericsson; and R2-120928 "Introduction of Carrier aggregation enhancements (status after RAN2 #77bis)". The standards and documents listed above are hereby expressly incorporated herein.

Figure 1:
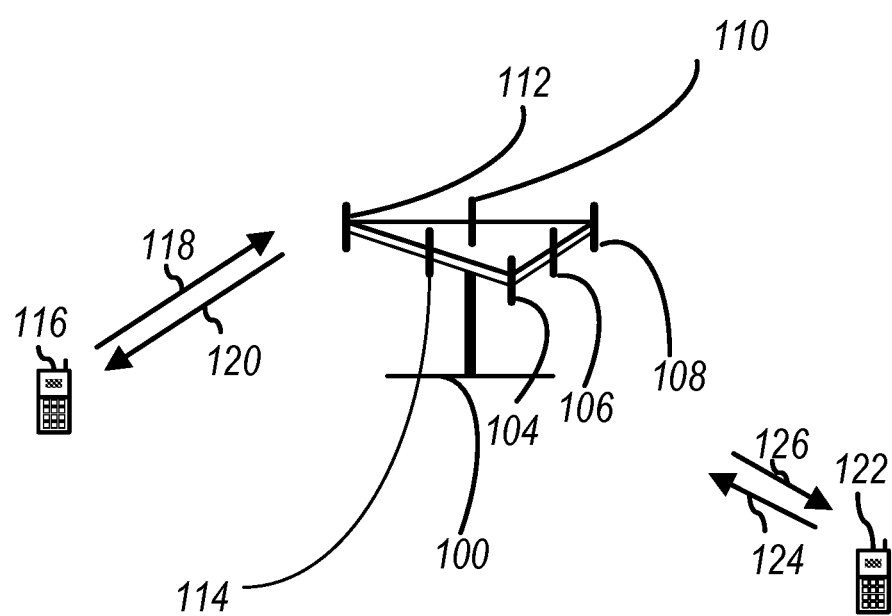
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 2:
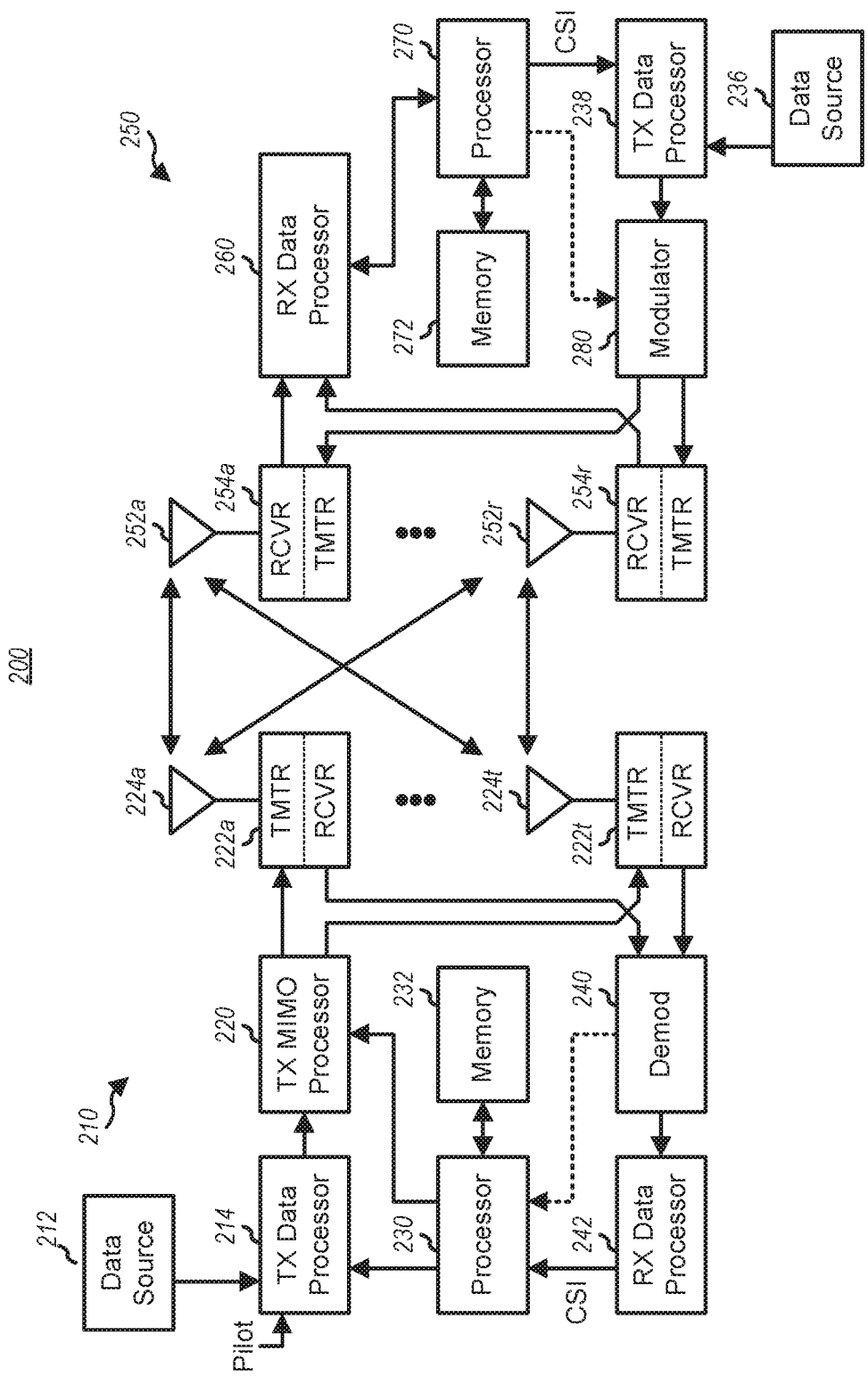
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel, response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel, $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
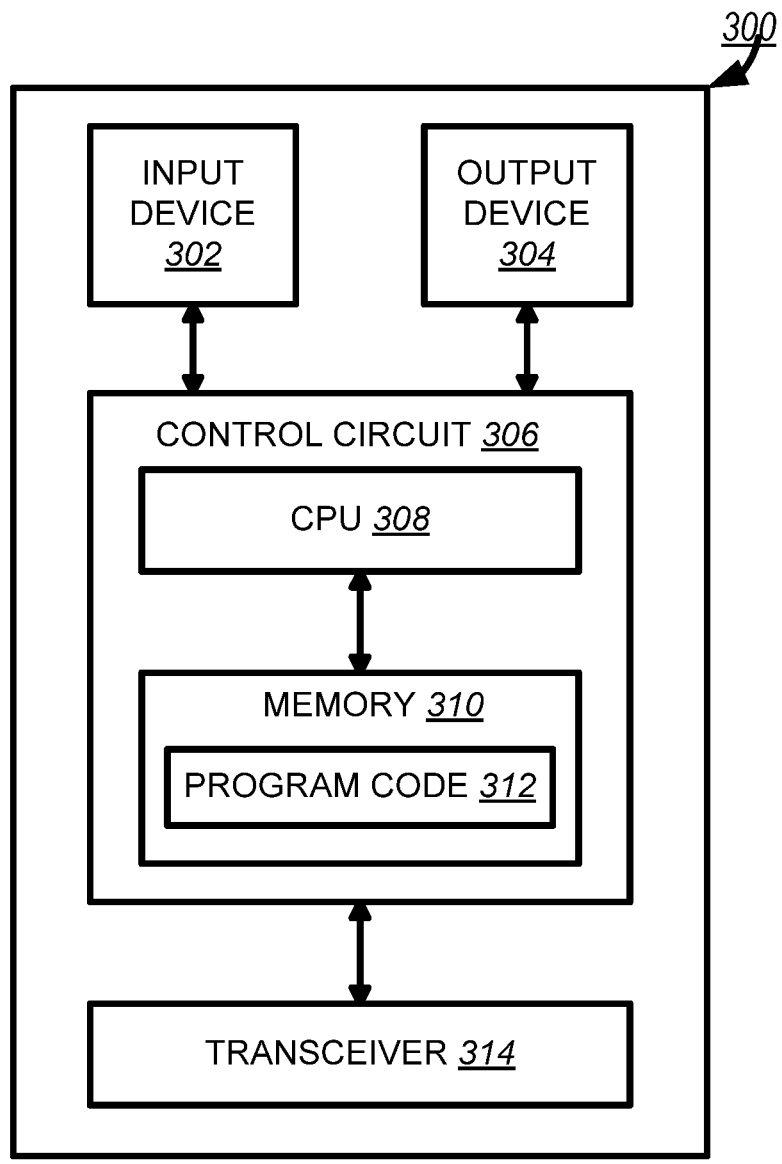
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
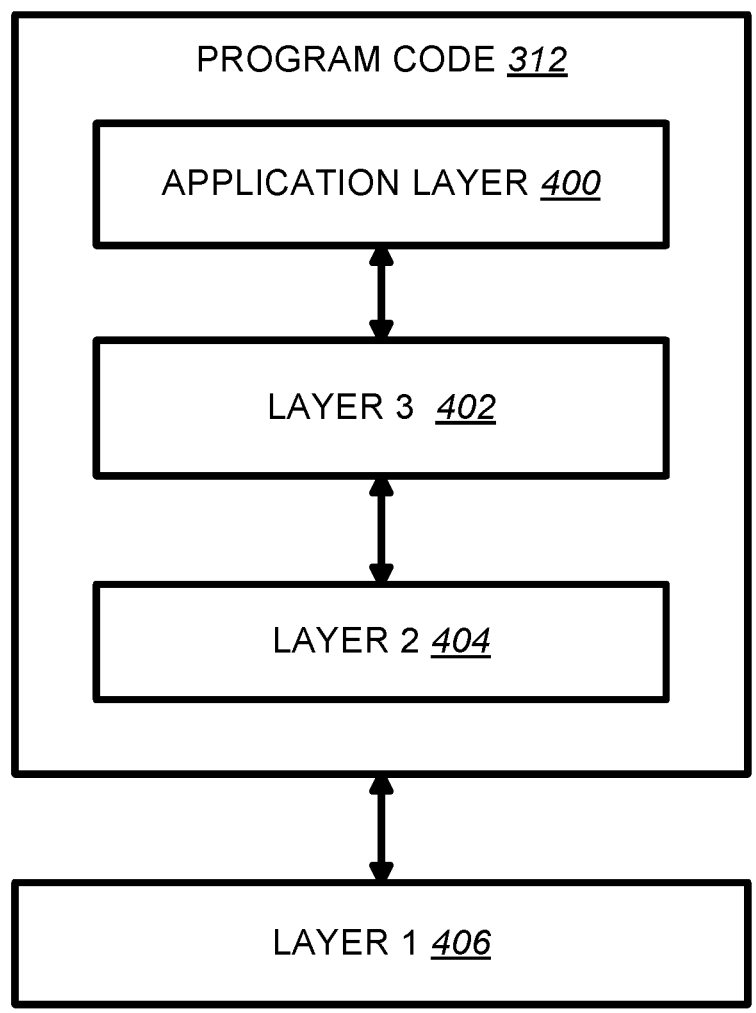
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

GPP TS 36,300 V10.5.0 provides the following description of uplink timing control and timing advance:
5.2.7.3 Uplink Timing Control
The timing advance is derived from the UL received timing and sent by the eNB to the UE which the UE uses to advance/delay its timings of transmissions to the eNB so as to compensate for propagation delay and thus time align the transmissions from different UEs with the receiver window of the eNB.

The timing advance command is on a per need basis with a granularity in the step size of 0.52 μs ($16 \times T_s$)

10.1.2.7 Timing Advance

In RRC_CONNECTED, the eNB is responsible for maintaining the timing advance. In some cases (e.g. during DRX), the timing advance is not necessarily always maintained and the MAC sublayer knows if the L1 is synchronised and which procedure to use to start transmitting in the uplink:

as long as the L1 is non-synchronised, uplink transmission can only take place on PRACH.

For a UE, cases where the UL synchronisation status moves from "synchronized" to "non-synchronised" include:

Expiration of a timer;
Non-synchronised handover;

The value of the timer is either UE specific and managed through dedicated signalling between the UE and the eNB, or cell specific and indicated via broadcast information. In both cases, the timer is normally restarted whenever a new timing advance is given by the eNB:

restarted to a UE specific value if any; or
restarted to a cell specific value otherwise.

Upon DL data arrival or for positioning purpose, a dedicated signature on PRACH can be allocated by the eNB to the UE. When a dedicated signature on PRACH is allocated, the UE shall perform the corresponding random access procedure regardless of its L1 synchronisation status.

Timing advance updates are signalled by the eNB to the UE in MAC PDUs addressed via C-RNTI.

In addition, 3GPP TS 36.321 V10.3.0 generally describes the procedure for maintenance of Uplink Time Alignment as follows:

5.2 Maintenance of Uplink Time Alignment

The UE has a configurable timer timeAlignmentTimer which is used to control how long the UE is considered uplink time aligned [8].

The UE shall:
when a Timing Advance Command MAC control element is received:
  apply the Timing Advance Command;
  start or restart timeAlignmentTimer.
when a Timing Advance Command is received in a Random Access Response message:
  if the Random Access Preamble was not selected by UE MAC:
    apply the Timing Advance Command;
    start or restart timeAlignmentTimer.
  else, if the timeAlignmentTimer is not running:
    apply the Timing Advance Command;
    start timeAlignmentTimer;
      when the contention resolution is considered not successful as described in subclause 5.1.5, stop timeAlignmentTimer.
  else:
    ignore the received Timing Advance Command.
when timeAlignmentTimer expires:
  flush all HARQ buffers;
  notify RRC to release PUCCH/SRS;
  clear any configured downlink assignments and uplink grants.

The UE shall not perform any uplink transmission except the Random Access Preamble transmission when timeAlignmentTimer is not running.

5.4.1 UL Grant Reception

In order to transmit on the UL-SCH the UE must have a valid uplink grant (except for non-adaptive HARQ retransmissions) which, it may receive dynamically on the PDCCH or in a Random Access Response or which may be configured semi-persistently. To perform requested transmissions, the MAC layer receives HARQ information from lower layers. When the physical layer is configured for uplink spatial multiplexing, the MAC layer can receive up to two grants (one per HARQ process) for the same TTI from lower layers.

When timeAlignmentTimer is running and the UE has a C-RNTI, Semi-Persistent Scheduling C-RNTI, or Temporary C-RNTI, the UE shall for each TTI and for each Serving Cell and for each grant received for this TTI:
  if an uplink grant for this TTI and this Serving Cell has been received on the PDCCH for the UE's C-RNTI or Temporary C-RNTI; or
  if an uplink grant for this TTI has been received in a Random Access Response:
    if the uplink grant is for UE's C-RNTI and if the previous uplink grant delivered to the HARQ entity for the same HARQ process was either an uplink grant received for the UE's Semi-Persistent Scheduling C-RNTI or a configured uplink grant:
      consider the NDI to have been toggled for the corresponding HARQ process regardless of the value of the NDI.
    deliver the uplink grant and the associated HARQ information to the HARQ entity for this TTI.

5.13 Activation/Deactivation of SCells

If the UE is configured with one or more SCells, the network may activate and deactivate the configured SCells. The PCell is always activated. The network activates and deactivates the SCell(s) by sending the Activation/Deactivation MAC control element described in subclause 6.1.3.8. Furthermore, the UE maintains a sCellDeactivationTimer timer per configured SCell and deactivates the associated SCell upon its expiry. The same initial timer value applies to each instance of the sCellDeactivationTimer and it is configured by RRC. The configured SCells are initially deactivated upon addition and after a handover.

The UE shall for each TTI and for each configured SCell:
  if the UE receives an Activation/Deactivation MAC control element in this TTI activating the SCell, the UE shall in the TTI according to the timing defined in [2]:
    activate the SCell; i.e. apply normal SCell operation including:
      SRS transmissions on the SCell;
      CQI/PMI/RI/PTI reporting for the SCell;
      PDCCH monitoring on the SCell;
      PDCCH monitoring for the SCell
    start or restart the sCellDeactivationTimer associated with the SCell;
  else, if the UE receives an Activation/Deactivation MAC control element in this TTI deactivating the SCell; or
  if the sCellDeactivationTimer associated with the activated SCell expires in this TTI:
    in the TTI according to the timing defined in [2]:
      deactivate the SCell;
      stop the sCellDeactivationTimer associated with the SCell;
      flush all HARQ buffers associated with the SCell.
  if PDCCH on the activated SCell indicates an uplink grant or downlink assignment; or
  if PDCCH on the Serving Cell scheduling the activated SCell indicates an uplink grant or a downlink assignment for the activated SCell:
    restart the sCellDeactivationTimer associated with the SCell;

if the SCell is deactivated:
   not transmit SRS on the SCell;
   not report CQI/PMI/RI/PTI for the SCell;
   not transmit on UL-SCH on the SCell;
   not monitor the PDCCH on the SCell;
   not monitor the PDCCH for the SCell.

6.1.3.5 Timing Advance Command MAC Control Element

The Timing Advance Command MAC control element is identified by MAC PDU subheader with LCID as specified in table 6.2.1-1.

It has a fixed size and consists of a single octet defined as follows (figure 6.1.3.5-1):
   R: reserved bit, set to "0";
   Timing Advance Command: This field indicates the index value $T_A$ (0, 1, 2 . . . 63) used to control the amount of timing adjustment that UE has to apply (see subclause 4.2.3 of [2].) The length of the field is 6 bits.

Figure 6:
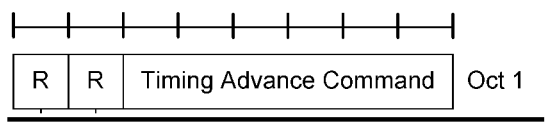
FIG. 6 is a reproduction of Figure 6.1.3.5-1; Timing Advance Command MAC control element.

FIG. 6 is a reproduction of Figure 6.1.3.5-1: Timing Advance Command MAC control element 6.1.5 MAC PDU (Random Access Response)

A MAC PDU consists of a MAC header and zero or more MAC Random Access Responses (MAC RAR) and optionally padding as described in figure 6.1.5-4.

The MAC header is of variable size.

A MAC PDU header consists of one or more MAC PDU subheaders: each subheader corresponding to a MAC RAR except for the Backoff Indicator subheader. If included, the Backoff Indicator subheader is only included once and is the first subheader included within the MAC PDU header.

A MAC PDU subheader consists of the three header fields E/T/RAPID (as described in figure 6.1.5-1) but for the Backoff Indicator subheader which consists of the five header field E/T/R/R/BI (as described in figure 6.1.5-2).

A MAC RAR consists of the four fields R/Timing Advance Command/UL Grant/Temporary C-RNTI (as described in figure 6.1.5-3).

Padding may occur after the last MAC RAR. Presence and length of padding is implicit based on TB size, size of MAC header and number of RARs.

Figure 7:
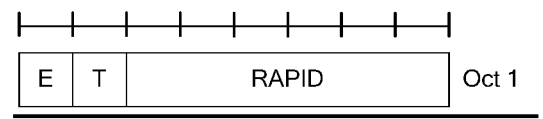
FIG. 7 is a reproduction of Figure 6.1.5-1: E/T/RAPID MAC subheader.

FIG. 7 is a reproduction of Figure 6.1.5-1: E/T/RAPID MAC subheader

Figure 8:
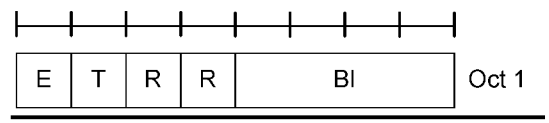
FIG. 8 is a reproduction of Figure 6.1.5-2: E/T/R/R/BI MAC subheader.

FIG. 8 is a reproduction of Figure 6.1.5-2: E/T/R/R/BI MAC subheader

Figure 9:
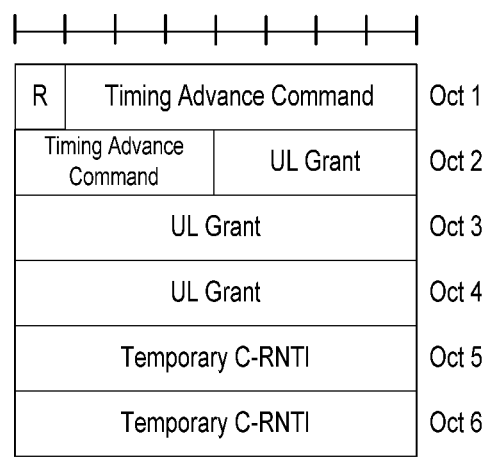
FIG. 9 is a reproduction of Figure 6.1.5-3: MAC RAR.

FIG. 9 is a reproduction of Figure 6.1.5-3: MAC RAR

Furthermore, 3GPP TS 36.213-V10.3.0 provides the following transmission timing adjustments:

4.2.3 Transmission Timing Adjustments

Upon reception of a timing advance command, the UE shall adjust its uplink transmission timing for PUCCH/PUSCH/SRS of the primary cell. The timing advance command indicates the change of the uplink timing relative to the current uplink timing as multiples of 16 $T_s$. The start timing of the random access preamble is specified in [3]. The UL transmission timing for PUSCH/SRS of a secondary cell is the same as the primary cell.

In case of random access response, 11-bit timing advance command [8], $T_A$, indicates $N_{TA}$ values by index values of $T_A = 0, 1, 2, \ldots, 1282$ where an amount of the time alignment is given by $N_{TA} = T_A \times 16$. $N_{TA}$ is defined in [3].

In other cases, 6-bit timing advance command [8], $T_A$, indicates adjustment of the current $N_{TA}$ value $N_{TA,old}$, to the new $N_{TA}$ value, $N_{TA,new}$, by index values of $T_A = 0, 1, 2, \ldots, 63$, where $N_{TA,new} = N_{TA,old} + (T_A - 31) \times 16$. Here, adjustment of $N_{TA}$ value by a positive or a negative amount indicates advancing or delaying the uplink transmission timing by a given amount respectively.

For a timing advance command received on subframe n, the corresponding adjustment of the timing shall apply from the beginning of subframe n+6. When the UE's uplink PUCCH/PUSCH/SRS transmissions in subframe n and subframe n+1 are overlapped due to the timing adjustment, the UE shall transmit complete subframe n and not transmit the overlapped part of subframe n+1.

If the received downlink timing changes and is not compensated or is only partly compensated by the uplink timing adjustment without timing advance command as specified in [10], the UE changes $N_{TA}$ accordingly.

Also, 3GPP TS 36.211-V10.3.0 (2011 September) provides the following description of uplink-downlink frame timing:

8.1 Uplink-Downlink Frame Timing

Transmission of the uplink radio frame number i from the UE shall start $(N_{TA} + N_{TA\ offset}) \times T_s$ seconds before the start of the corresponding downlink radio frame at the $0 \leq N_{TA} \leq 20512$, $N_{TA\ offset} = 0$ for frame structure type 1 and $N_{TA\ offset} = 624$ for frame structure type 2. Note that not all slots in a radio frame may be transmitted. One example hereof is TDD, where only a subset of the slots in a radio frame is transmitted.

Figure 10:
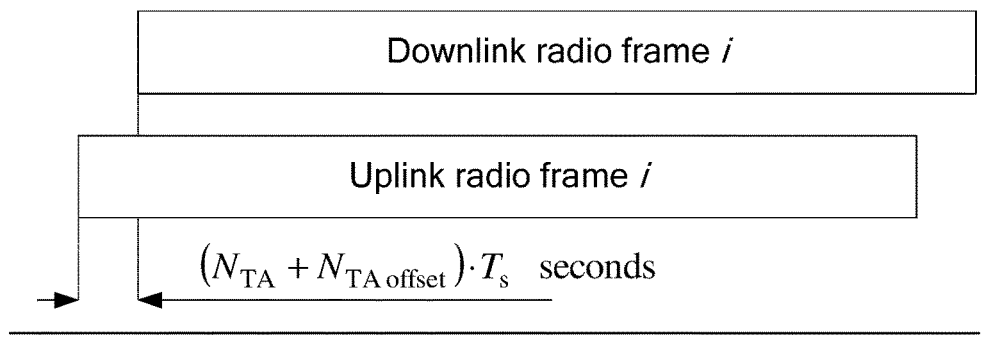
FIG. 10 is a reproduction of Figure 8.1-1: Uplink-downlink timing relation.

FIG. 10 is a reproduction of Figure 8.1-1: Uplink-downlink timing relation.

Additionally, 3GPP R2-12XXXX describes the multiple timing advances as follows:

J.X Multiple Timing Advances

This subclause reflects the agreements reached on carrier aggregation enhancements for Rel-11 that may not necessarily fit in the core of the specification but which needs to be captured in the absence of corresponding details in Stage 3 specifications.

Serving cells having UL to which the same timing advance applies (typically corresponding to the serving cells hosted by the same receiver) and using the same timing reference are grouped in a timing advance group (TAG). Each TAG contains at least one serving cell with configured uplink, and the mapping of each serving cell to a TAG is configured by the serving eNB with RRC signaling. The mapping between a Scell and a TAG may be reconfigured with RRC signaling. A UE supporting multiple timing advances is required to support at least 2 TAGs; i.e. one TAG containing the Pcell (pTAG), whose identity will be 0, and one or more TAGs not containing the Pcell (sTAG). It will be possible to configure 4 TAGs.

With respect to timing advance maintenance:
   Timing advance maintenance and the timing reference for pTAG follow Rel-10 principles;
   To obtain initial UL time alignment for a sTAG, eNB initiated random access procedure should be used;
   There is one timing reference and one time alignment timer (TAT) per TAG and each TAT may be configured with a different value;
   In an sTAG UE may use one of any activated SCells from this sTAG as a timing reference, but UE is not supposed to change it unless necessary;
   When the PCell TAT is not running, the SCell TAT should not be running;
   Upon deactivation of the last SCell in a sTAG, UE does not stop TAT of the TAG;
   Upon removal of the last SCell in a sTAG, TAT of the timing advance group should not be running. It is FFS whether this will be achieved by deconfiguring the TAT or by explicitly stopping the TAT when the SCell is removed from the timing advance group;

NOTE: Random access based solution is sufficient for supporting multiple timing advance i.e. TDOA based solutions will not be considered for timing advance maintenance.

With respect to the random access procedure:
Random access procedures in parallel shall not be supported for a UE;
If a new random access procedure is requested (either by UE or network) while another RA procedure is already ongoing, it is up to the UE implementation whether to continue with the ongoing procedure or start with the new procedure;

With respect to the RA procedure on SCell(s):
The eNB initiates a non-contention based random access procedure only via a PDCCH order for an activated SCell. This PDCCH order is sent on the scheduling cell of this SCell. Random Access resources can be configured for each SCell in sTAG;
Upon new UL data arrival the UE shall not trigger an random access procedure on an SCell;
Upon reaching the maximum number of transmitted preambles:
MAC does not indicate it to RRC i.e. RLF is not triggered;
UE will not report this condition to eNB;
NOTE: Timing advance grouping is performed without requiring any additional UE assisted information. There will be no radio link monitoring for SCells.

Furthermore, 3GPP R2-121552 (Ericsson) generally states that it may be possible for the eNB (evolved Node B) to start a UEs TA (Timing Alignment/Advance) timer with a TAC (Timing Advance Command) MAC CE (Control Element) containing zero. And it also proposes that at TA group creation the associated TA value shall be set to zero.

There are two formats for TA (Timing Alignment/Advance) commands. One format is an 11-bit absolute value (1-bit); and the other format is a 6-bit offset value. In general, the normal procedure of getting a valid TA for an SCell (Secondary Cell) is (i) to send a activation command (i.e., a MAC CE) to activate the Scell, (ii) to send a PDCCH (Physical Downlink Control Channel) order to trigger a RACH (Random Access Channel) procedure on the SCell to get an 11-bit TA command in the Random Access Response of the RACH procedure, and (iii) to use the TA command to start the TA timer and the PDCCH scheduling for PUSCH (Physical Uplink Shared Channel) transmission. Afterward, the eNB could do UL timing adjustments directly by sending the 6-bit TA command without doing a RACH procedure based on the observation of UL timing of the previous UL transmissions.

As discussed above, 3GPP R2-121552 states that it may be possible for the eNB would to start a UEs TA timer with a TAC MAC CE containing zero. However, although it appears that the RACH procedure may be saved, there remains signalling waste and delay in starting the UL (Uplink) transmission. The general concept of the invention is to start a PUSCH transmission earlier than disclosed in the prior art when an SCell is newly configured and has just been activated in order to avoid using and wasting unnecessary signalling (such as sending TA commands).

Figure 5:
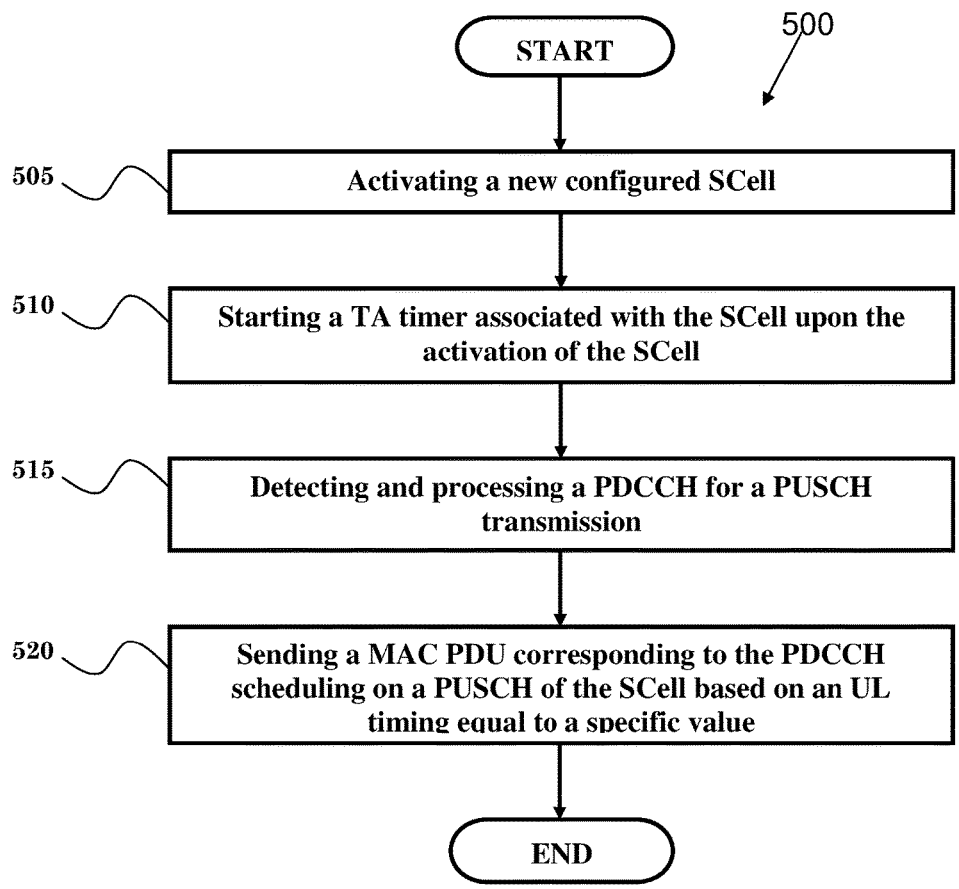
FIG. 5 is a flow chart according to one exemplary embodiment.

FIG. 5 is a flow chart 500 in accordance with one exemplary embodiment. In step 505, a newly configured SCell is activated. In one embodiment, the SCell is activated through an activation command that could be a MAC (Media Access Control) CE (Control Element). In addition, the SCell could be configured through a first RRC (Radio Resource Control) configuration or reconfiguration message. Furthermore, the specific value could be configured through the first RRC (Radio Resource Control) configuration or reconfiguration message, or through a second RRC (Radio Resource Control) configuration or reconfiguration message.

In step 510 of FIG. 5, a TA timer associated with the SCell is started upon the activation of the SCell. In one embodiment, the TA timer associated with the SCell could also be started upon detection of the PDCCH scheduling. Furthermore, the TA timer associated with the SCell could be set to a non-zero value. The TA timer could also be set to the specific value if the TA timer has been previously set to infinity or to a number that is larger than the specific value. In one embodiment, the specific value could be a zero (0) or a value that was previously used and retained when the TA timer has previously expired and is not currently running.

In step 515 of FIG. 5, a PDCCH for a PUSCH (Physical Uplink Shared Channel) transmission is detected and processed. In one embodiment the PDCCH for the PUSCH (Physical Uplink Shared Channel) transmission is detected and processed even if the TA timer associated with the SCell is not running.

In step 520 of FIG. 5, a MAC (Mac Access Control) PDU (Protocol Data Unit) corresponding to the PDCCH scheduling is sent on a PUSCH of the SCell based on an UL transmission timing equal to a specific value. In one embodiment, the UL transmission timing is a TA value, $N_{TA}$. Transmission of the uplink radio frame number i from the UE shall start $(N_{TA}+N_{TA\ offset})\times T_s$ seconds before the start of the corresponding downlink radio frame at the UE, where $0 \leq N_{TA} \leq 20512$, $N_{TA\ offset}=0$ for frame structure type 1 and $N_{TA\ offset}=624$ for frame structure type 2.

Referring back to FIGS. 3 and 4, the device 300 includes a program code 312 stored in memory 310. In one embodiment, the CPU 308 could execute the program code 312 (i) to activate a newly configured SCell, (ii) to start a TA timer associated with the SCell upon the activation of the SCell, (iii) to detect and process a PDCCH for a PUSCH transmission, and (iv) to send a MAC PDU (Protocol Data Unit) corresponding to the PDCCH scheduling on a PUSCH of the SCell based on an UL transmission timing equal to a specific value. In one embodiment, a SRS (Sounding Reference Signal) configuration is not released upon deactivation of the SCell or upon TA timer expiry.

In addition, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above, concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components; optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two, A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for reducing signaling for UL (Uplink) scheduling, comprising:
   activating a newly configured SCell (Secondary Cell);
   starting a TA (Timing Alignment/Advance) timer associated with the SCell upon detection of a specific DL (Downlink) signaling in order to avoid using unnecessary TA commands;
   detecting and processing a PDCCH (Physical Downlink Control Channel) for a PUSCH (Physical Uplink Shared Channel) transmission; and
   sending a MAC (Mac Access Control) PDU (Protocol Data Unit) corresponding to the PDCCH scheduling on a PUSCH of the SCell based on an UL transmission timing equal to a specific value.

2. The method of claim 1, wherein the specific DL signaling is the PDCCH scheduling for the PUSCH or the activation of the SCell.

3. The method of claim 1, wherein the PDCCH for the PUSCH transmission is detected and processed even if the TA timer associated with the SCell is not running.

4. The method of claim 1, wherein the UL transmission timing is a TA value, $N_{TA}$, and transmission of the uplink radio frame number i from the UE shall start $(N_{TA}+N_{TA\ offset}) \times T_s$ seconds before the start of the corresponding downlink radio frame at the UE, where $0 \leq N_{TA} \leq 20512$, $N_{TA\ offset}=0$ for frame structure type 1 and $N_{TA\ offset}=624$ for frame structure type 2.

5. The method of claim 1, wherein the SCell is configured through a first RRC (Radio Resource Control) configuration or reconfiguration message, and the specific value could be configured through the first RRC configuration or reconfiguration message, or through a second RRC configuration or reconfiguration message.

6. The method of claim 1, wherein the SCell is activated through an activation command that is a MAC CE (Control Element).

7. The method of claim 1, wherein the specific value is a zero (0) or is a value that was previously used and retained when the TA timer has expired and is not currently running.

8. The method of claim 1, wherein a SRS (Sounding Reference Signal) configuration is not released upon deactivation of the SCell or upon TA timer expiry.

9. A method for setting TA value for UL (Uplink) scheduling, comprising:
    activating a newly configured SCell (Secondary Cell);
    starting a TA (Timing Alignment/Advance) timer associated with the SCell upon detection of a specific DL (Downlink) signaling in order to avoid using unnecessary TA commands; and
    setting TA value associated with the SCell equals to a first specific value if the TA timer has been set to infinity or to a number that is larger than a second specific value.

10. The method of claim 9, wherein the first specific value is a zero (0) or is a value that was previously used and retained when the TA timer has expired and is not currently running.

11. A communication device for reducing signaling for UL (Uplink) scheduling, the communication device comprising:
    a control circuit;
    a processor installed in the control circuit; and
    a memory installed in the control circuit and operatively coupled to the processor;
    wherein the processor is configured to execute a program code stored in the memory to reduce signaling for UL scheduling by:
        activating a newly configured SCell (Secondary Cell);
        starting a TA (Timing Alignment/Advance) timer associated with the SCell upon detection of a specific DL (Downlink) signaling in order to avoid using unnecessary TA commands;
        detecting and processing a PDCCH (Physical Downlink Control Channel) for a PUSCH (Physical Uplink Shared Channel) transmission; and
        sending a MAC (Mac Access Control) PDU (Protocol Data Unit) corresponding to the PDCCH scheduling on a PUSCH of the SCell based on an UL transmission timing equal to a specific value.

12. The communication device of claim 11, wherein the specific DL signaling is the PDCCH scheduling for the PUSCH or the activation of the SCell.

13. The communication device of claim 11, wherein the PDCCH (Physical Downlink Control Channel) for the PUSCH transmission is detected and processed even if the TA timer associated with the SCell is not running.

14. The communication device of claim 11, wherein the UL transmission timing is a TA value, $N_{TA}$, and transmission of the uplink radio frame number i from the UE shall start $(N_{TA}+N_{TA\ offset}) \times T_s$ seconds before the start of the corresponding downlink radio frame at the UE, where $0 \leq N_{TA} \leq 20512$, $N_{TA\ offset}=0$ for frame structure type 1 and $N_{TA\ offset}=624$ for frame structure type 2.

15. The communication device of claim 11, wherein the SCell is configured through a first RRC (Radio Resource Control) configuration or reconfiguration message, and the specific value could be configured through the first RRC configuration or reconfiguration message, or through a second RRC configuration or reconfiguration message.

16. The communication device of claim 11, wherein the SCell is activated through an activation command that is a MAC CE (Control Element).

17. The communication device of claim 11, wherein the specific value is a zero (0) or is a value that was previously used and retained when the TA timer has expired and is not currently running.

18. The communication device of claim 11, wherein a SRS (Sounding Reference Signal) configuration is not released upon deactivation of the SCell or upon TA timer expiry.

19. A communication device for setting TA value for UL (Uplink) scheduling, the communication device comprising:
    a control circuit;
    a processor installed in the control circuit; and
    a memory installed in the control circuit and operatively coupled to the processor;
    wherein the processor is configured to execute a program code stored in the memory to set TA value for UL scheduling by:
        activating a newly configured SCell (Secondary Cell);
        starting a TA (Timing Alignment/Advance) timer associated with the SCell upon detection of a specific DL (Downlink) signaling in order to avoid using unnecessary TA commands; and
        setting TA value associated with the SCell equals to a first specific value if the TA timer has been set to infinity or to a number that is larger than a second specific value.

20. The method of claim 19, wherein the first specific value is a zero (0) or is a value that was previously used and retained when the TA timer has expired and is not currently running.

* * * * *